United States Patent [19]
Bladow et al.

[11] Patent Number: 5,688,006
[45] Date of Patent: Nov. 18, 1997

[54] BUMPER ASSEMBLY WITH EXTENSION PANEL

[75] Inventors: Jeffrey L. Bladow, Novi; Robert E. Kosior, Livonia; Piyush P. Parikh, West Bloomfield, all of Mich.

[73] Assignee: Ford Global Technologies, Inc., Dearborn, Mich.

[21] Appl. No.: 417,355

[22] Filed: Apr. 5, 1995

[51] Int. Cl.⁶ .................................................. B60R 19/02
[52] U.S. Cl. .......................... 293/120; 293/121; 293/132; 293/136
[58] Field of Search ............................ 293/102, 120, 293/121, 122, 136, 132

[56] References Cited

U.S. PATENT DOCUMENTS

| | | | |
|---|---|---|---|
| 4,457,547 | 7/1984 | Sekiyama et al. | 293/110 |
| 4,586,739 | 5/1986 | Loren et al. | 293/120 |
| 4,830,416 | 5/1989 | Matsuoka | 293/120 |
| 4,830,418 | 5/1989 | Gest | 293/134 |
| 4,877,279 | 10/1989 | Logan | 293/121 |
| 4,941,701 | 7/1990 | Loren | 293/155 |
| 4,968,076 | 11/1990 | Kuroki | 293/121 |

*Primary Examiner*—David M. Mitchell
*Assistant Examiner*—Kia M. Robinson
*Attorney, Agent, or Firm*—Daniel M. Stock

[57] ABSTRACT

A rear bumper assembly for an automotive vehicle is provided, which includes a bumper bar, an energy absorbing mechanism, a bumper cover overlying the energy absorbing mechanism of the bumper bar, and a rigid extension panel secured to the vehicle body and positioned to present an abutting surface to a stop surface formed on the bumper cover at a position intermediate of a vertically extending part of the vehicle body and essentially coplanar with it to prevent contact between the bumper cover and the vertically extending portion of the vehicle body during impact-induced compression.

4 Claims, 3 Drawing Sheets

BUMPER ASSEMBLY WITH EXTENSION PANEL

BACKGROUND OF THE INVENTION

1. Field of the Invention

The present invention relates generally to bumper structures for motor vehicles, and more particularly to rear bumper structures that include a bumper cover and an extension panel secured between the bumper cover and the vehicle body.

2. Description of the Prior Art

It is well known in the automotive vehicle arts to provide at the rear of a vehicle a bumper assembly, such as that indicated at B in FIGS. 1 and 2, which projects rearwardly from the vehicle body, as indicated at V. The bumper B is fixed to the body V and projects rearwardly beneath lower surfaces of a trunk cover or deck lid, as indicated at T.

It is desirable, and, as a matter of fact, mandated by federal regulation in the United States of America, that low-speed impact with the bumper B not result in significant damage to the vehicle. As can be seen in FIG. 2, compression of the bumper B can result in deformation of the bumper B to engage lower surfaces of the trunk or deck lid T. Such engagement may directly damage the deck lid T, and since the deck lid T, as is well known, is preferably pivotally mounted to the vehicle body V, upward pivotal movement may result in damage to a latch L, indicated diagrammatically as engaging an inner portion $T_i$ of the deck lid T and mounted on the vehicle body V. Deformation of the deck lid T and the latch L may result from this contact.

It is accordingly deemed desirable that a bumper assembly be provided which does not interact with the adjacent structure of the vehicle body, and in particular the trunk or deck lid as described and experienced in the prior art.

SUMMARY OF THE INVENTION

A bumper assembly with the desired function as provided by providing a substantially rigid bumper bar fixed to the vehicle body, energy absorbing means mounted on the bumper bar, a generally U-shaped molded flexible bumper overlying the energy absorbing means, all positioned below the deck lid of the vehicle, and a rigid extension panel secured to the body vertically intermediate the deck lid of the vehicle and the bumper bar to define an abutting surface for engaging the bumper cover and thereby preventing interaction between the bumper cover and the deck lid of the vehicle.

According to one aspect of the present invention, the extension panel is fabricated as an unpainted molded plastic panel.

According to another aspect of the present invention, the extension panel is positioned substantially longitudinally rearwardly of the deck lid and defines a horizontal step surface.

BRIEF DESCRIPTION OF THE DRAWINGS

Advantageous objects and features of the present invention will be clear to those skilled in the automotive vehicle arts upon reading the following description with reference to the accompanying drawings, in which.

DESCRIPTION OF THE PREFERRED EMBODIMENTS

Figure 1:
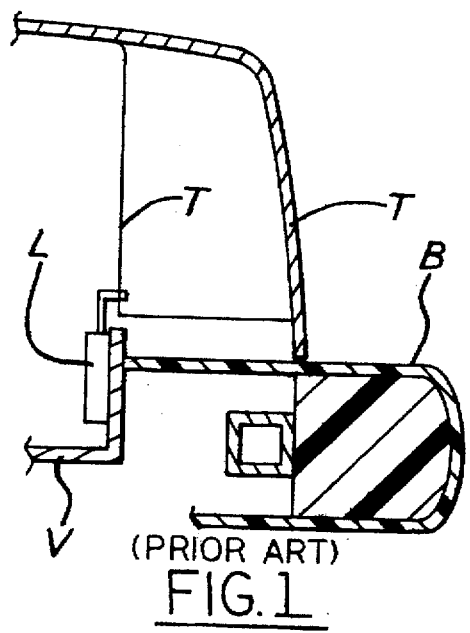
FIG. 1 is a prior art diagrammatic cross section view of a rear portion of an automotive vehicle employing a rear bumper assembly in an uncompressed state.
Figure 2:
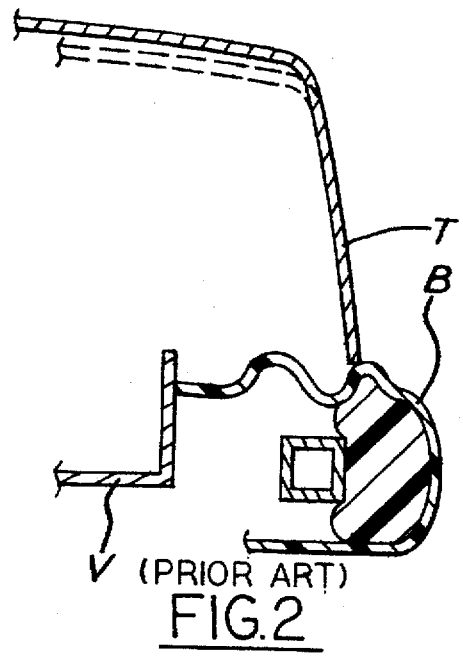
FIG. 2 is a view of a rear portion of an automotive vehicle employing the prior art bumper assembly of FIG. 1 in the compressed state.
Figure 3:
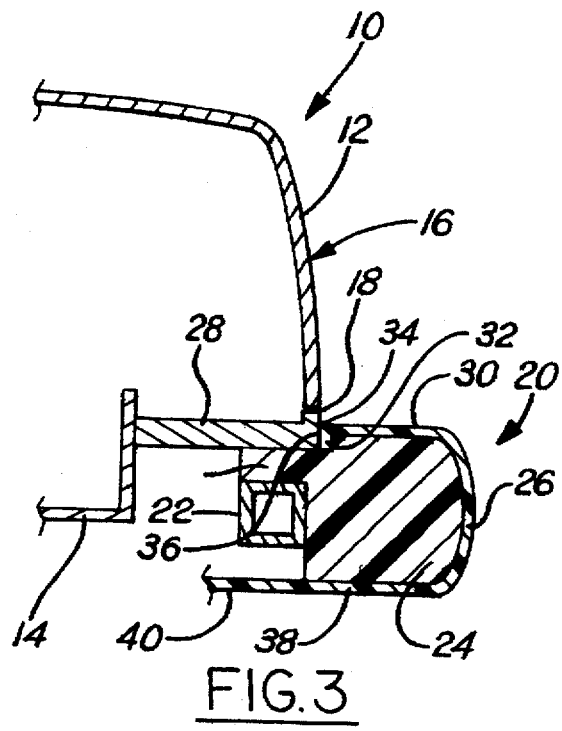
FIG. 3 is a diagrammatic cross section view similar to FIG. 1 illustrating the bumper assembly of the present invention in the uncompressed state.

Turning now to the drawings, and particularly to FIG. 3 thereof, an automotive vehicle 10 is illustrated as including a deck lid 12 pivotally mounted in a known manner (not shown) on a body 14 of the vehicle 10. The deck lid 12 includes a generally vertically extending panel 16 having a lower edge surface 18. An improved bumper assembly 20 is positioned vertically below the lower edge 18 of the deck lid 12 and projects rearwardly from the panel 16. The bumper assembly 20 is illustrated as generally comprising a bumper bar 22, energy absorbing mechanism 24, a bumper cover 26, and an extension panel 28.

The bumper bar 22 extends laterally of the vehicle 10 and is preferably fixedly secured to the body 14 in a known manner. It is here illustrated as being of hollow square cross section, although other configurations may be chosen consistent with the structural and energy management needs of the vehicle 10, and the particular configuration does not form a part of the present invention.

The energy absorbing mechanism 24 is illustrated as a resilient block which may be fabricated from known open or closed cell foam energy absorbing materials, well known in the automotive industry. Those skilled in the automotive energy management arts will appreciate that other energy absorbing mechanisms might also be used such as springs and hydromechanical devices. In the preferred embodiment illustrated, however, a foam block is used which is positioned vertically intermediate the deck lid 12 and the bumper bar 22 and includes a cushion portion positioned vertically intermediate the bumper bar and the deck lid 12. The energy absorbing mechanism 24 is preferably an elongated member extending laterally at least coextensively with the bumper bar 22.

The bumper cover 26 is preferably formed as a flexible, molded, generally U-shaped member which may be conveniently formed of a thermoplastic and is placed in overlying relationship with respect to the bumper bar 22 and the energy absorbing mechanism 24 extending laterally of the vehicle 10. The bumper cover 26 includes a generally horizontal upper wall 30 having a turned-down portion 32 at its forward end 34 to define a stop surface 36. The bumper cover 26 also includes a horizontal lower wall 38 having a forward end 40 projecting towards the body 14.

The extension panel 28 is preferably formed as an unpainted molded plastic panel extending laterally of the vehicle and fixedly secured by known fastening means, such as threaded fasteners, clips, adhesives or the like, to the vehicle body 14. The extension panel 28 is preferably substantially rigid and includes a laterally extending abutting surface 42 arranged in complementary relationship with respect to the stop surface 36 of the bumper cover 26. The extension panel 28 is positioned vertically intermediate the lower edge surface 18 of the deck lid 12.

Figure 4:
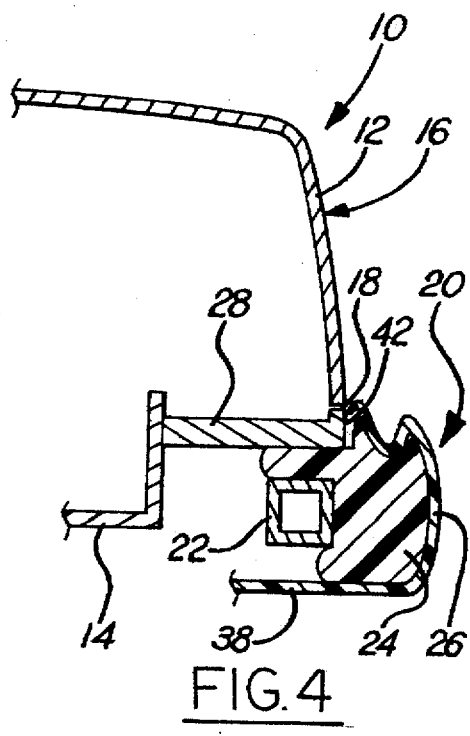
FIG. 4 is a cross-sectional view similar to FIG. 2 showing the bumper assembly according to the present invention in a compressed state.

In a low-speed (around five miles per hour) impact situation, the energy absorbing mechanism 24 is compressed and the upper wall 30 of the bumper cover 26 is deflected through columnar loading, as indicated in FIG. 4. It will be noted that there is no contact between the upper wall 30 and the deck lid 12 in the region of the lower edge 18 so that no load is transmitted from the deflecting bumper assembly 20 to the deck lid 12. It will be appreciated that the lower wall 38 of the bumper cover 26 might be similarly caused to react with the vehicle body 14 or to pass free of it altogether during the compression shown in FIG. 4. Such deflection of the lower wall 38 is not shown in the figures for convenience.

Figure 5:
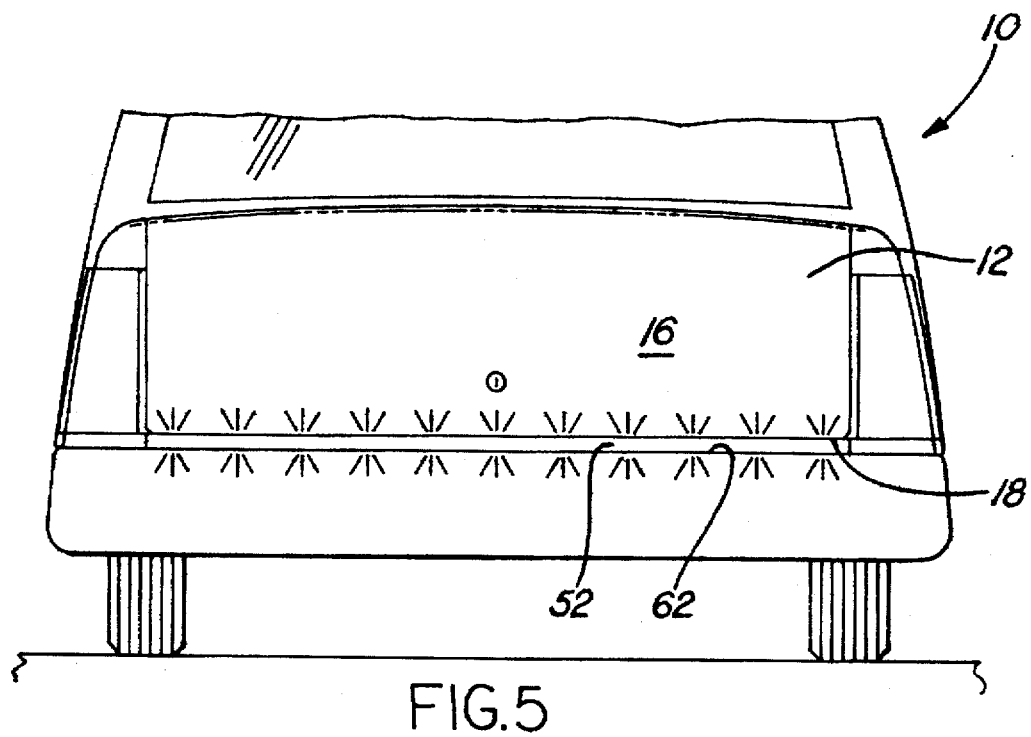
FIG. 5 is a rear view of an automotive vehicle employing another embodiment of a bumper assembly according to the present invention.
Figure 6:
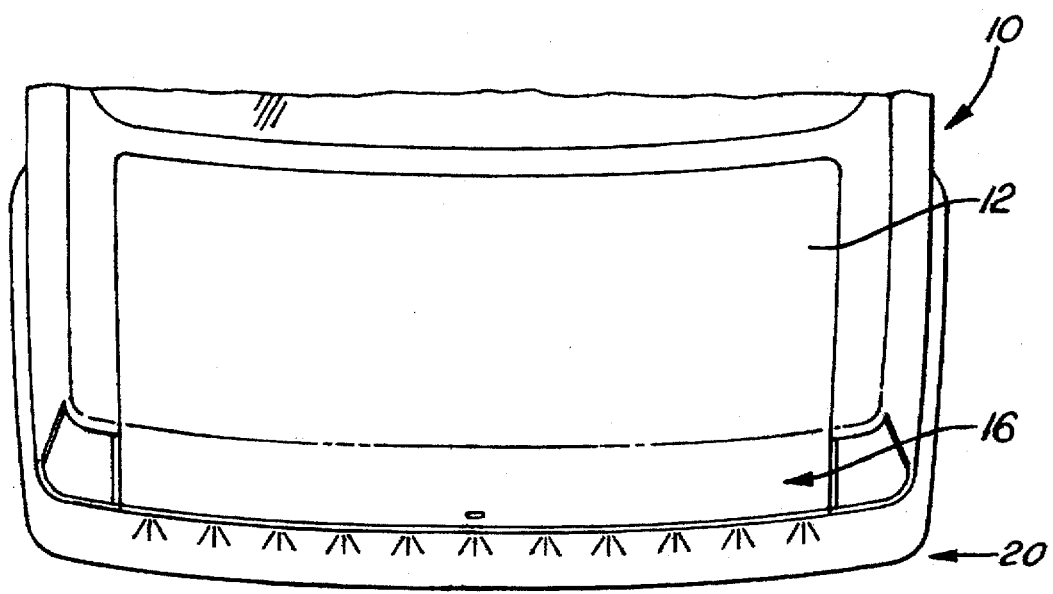
FIG. 6 is a top view of the rear of the vehicle body illustrated in FIG. 5.
Figure 7:
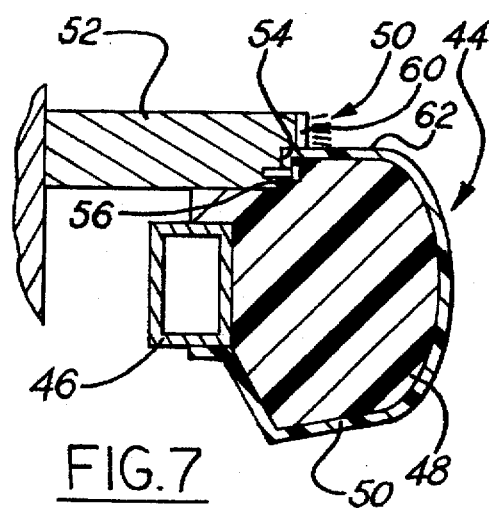
FIG. 7 is a cross-sectional view of the embodiment of FIGS. 5 and 6.

Turning now to FIGS. 5–7, and in particular to FIG. 7, another configuration of a bumper assembly, designated generally at 44, is illustrated as including a bumper bar 46, an energy absorbing mechanism 48, a bumper cover 50, and an extension panel 52. The extension panel 52 includes an abutting surface 54 that cooperates with the stop surface 56 of the bumper cover 50, in the same manner as the surfaces 36, 42 cooperate in the embodiment of FIGS. 3 and 4. The extension panel 52 further includes a vertically extending decorative portion 58 upon which reflector means, such as lighting of reflective surfaces, indicated generally at 60, may be deployed. FIGS. 5 and 6 illustrate the manner in which the light projection reflection of the reflector means 60 is positioned for visibility outside of the vehicle between an upper surface 62 of the bumper cover 50 and the lower edge surface 18 of the deck lid 12.

Figure 8:
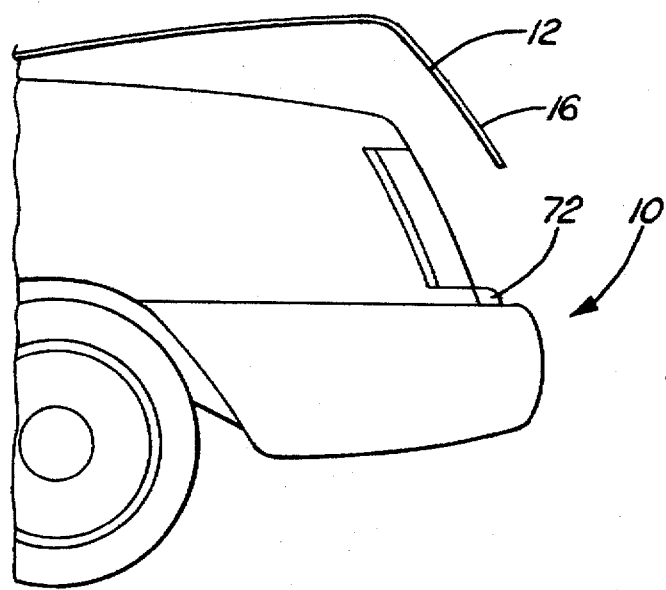
FIG. 8 is a side elevational view of the rear portion of a vehicle using yet another embodiment bumper assembly of the present invention.
Figure 9:
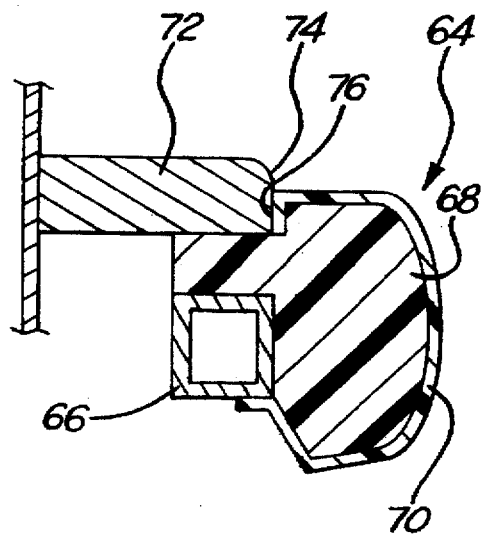
FIG. 9 is a cross-sectional view of the bumper assembly of FIG. 8.

Turning now to FIGS. 8–9, another alternative embodiment of a bumper assembly, designated generally at 64, is provided, which includes parts cooperating in the same fashion as the previously described embodiments. It includes a bumper bar 66, an energy absorbing mechanism 68, a bumper cover 70, and an extension panel 72. The extension panel 72 includes an abutting surface 74 that cooperates with a stop surface 76 of the bumper cover 70, in the manner described with respect to the previous embodiments. The embodiment of FIGS. 8–9 differs from the others in that the extension panel 72 extends rearwardly beyond the outer planar surface 16 of deck lid 12 and presents an upper horizontal step surface, indicated at 78. The fixed securement of a rigid panel, such as the panel 72 to the vehicle body 14, can be utilized to provide a convenient step surface for certain types of vehicles such as light trucks and station wagons.

Figure 10:
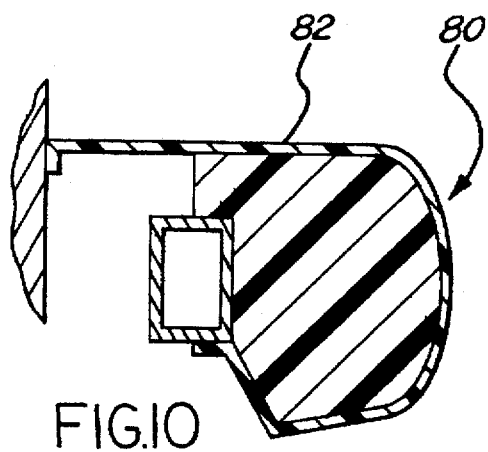
FIG. 10 is another cross-sectional view of a prior art bumper assembly illustrative of another advantage of the bumper assembly of the present invention over the prior art.

The cross-sectional view of a bumper assembly in FIG. 10, indicated generally at 80, of the type generally used in the prior art, illustrates that provision of the extension panel allows for the definition of a bumper cover, such as that indicated at 50 in FIG. 7, which presents a much shallower draw for purposes of molding than that typically employed in the prior art, in which a long wall surface, such as the upper wall 82, is provided to extend, in decorative fashion, forwardly on a rear bumper toward a portion of the body 14 remotely spaced therefrom.

While only certain embodiments of the bumper assembly according to the present invention have been described, others may be possible without departing from the scope of the following claims.

We claim:

1. A rear bumper assembly for an automotive vehicle having a body including a rear portion terminating in a vertically extending finish panel defining an outer planar surface and including a lower edge surface extending laterally of the body, the bumper assembly comprising:

a substantially rigid bumper bar fixedly secured to the body and extending laterally of the body below the vertically extending finish panel lower edge surface;

energy absorbing means mounted on the bumper bar rearwardly of the vertically extending finish panel below the lower edge thereof;

a generally U-shaped molded flexible bumper cover overlying the energy absorbing means and having a horizontal lower wall having a forward end projecting toward the body and a horizontal upper wall having a turned-down stop surface at its forward end defining a laterally extending surface spaced longitudinally rearwardly of the vertical panel outer planar surface; and a substantially rigid extension panel fixedly secured to the body vertically intermediate the vertical panel and the bumper bar and defining a laterally extending abutting surface complementary to the bumper cover stop surface and longitudinally positioned substantially coplanar with the vertical panel outer surface and abuttingly engaging the bumper cover stop surface whereby longitudinal compression of the energy absorbing means and bending of the bumper cover upper wall is effected rearwardly of said vertical panel outer planar surface upon imposition of forces substantially longitudinal to said bumper assembly.

2. A bumper assembly as defined in claim 1 wherein the extension panel is an unpainted molded plastic panel.

3. A bumper assembly as defined in claim 1 wherein the energy absorbing means comprises a foam block.

4. A bumper assembly as defined in claim 3 wherein the energy absorbing means further comprises a cushion portion positioned vertically intermediate the bumper bar and the extension panel.

* * * * *